United States Patent [19]

Van Gilst et al.

[11] 4,121,538
[45] Oct. 24, 1978

[54] FARROWING CRATE

[75] Inventors: Carl Van Gilst; Jack Devos, both of Goshen, Ind.

[73] Assignee: AG Best Corporation, Napanee, Ind.

[21] Appl. No.: 758,430

[22] Filed: Jan. 11, 1977

[51] Int. Cl.$^2$ .............................................. A01K 1/02
[52] U.S. Cl. ..................................................... 119/20
[58] Field of Search ............................. 119/20, 27, 16

[56] References Cited

U.S. PATENT DOCUMENTS

| 3,318,286 | 5/1967 | Hargett, Jr. | 119/20 |
| 3,412,711 | 11/1968 | Martensson et al. | 119/20 |

FOREIGN PATENT DOCUMENTS 415,163 12/1966 Switzerland .............................. 119/20

*Primary Examiner*—Hugh R. Chamblee
*Attorney, Agent, or Firm*—Craig & Antonelli

[57] ABSTRACT

A farrowing crate is provided which has adjustable connecting structure for connecting the side walls thereof to the end walls thereof in various adjusted positions with the farrowing crate width at the top remaining constant and the width at the bottom being increased step-by-step as the side wall is raised. The side walls are constructed of tubular construction with a lower horizontal tube having pins welded thereto which are selectively engagable in apertures arranged at respective steps of stepped brackets attached to the end walls. The stepped brackets exhibit inwardly facing vertical step surfaces which restrain lateral outward movement of the side wall during the adjustment process. The upper tubular member of the side wall includes locking apertures. Upper brackets are attached to the upper parts of the end walls, which upper brackets form stepwise nesting places for the upper tubular member as well as apertures alignable with the locking apertures to accommodate latch pins.

19 Claims, 5 Drawing Figures

FARROWING CRATE

BACKGROUND AND SUMMARY OF THE INVENTION

The present invention relates to farrowing crates, which are the accepted method for preventing sows from laying on their baby pigs during and after farrowing. It is well known that a farrowing crate should be adjustable in width and height in order to accommodate various size sows.

For accommodating increasingly larger sows, it has been found to be sufficient if the lower section is adjustable be made wider while keeping the top narrower. This type of adjustment allows the larger sows more room to lay down while still retaining them from excessive turning or lateral movement when in the standing position.

Many methods are currently applied for accomplishing the adjustment of farrowing crates. For example, there are systems which include a plurality of adjustment positions for both the top and bottom of a farrowing crate side wall. However, most of these existing arrangements require the use of tools to tighten and untighten threaded members or the like. Those few systems which are designed to accommodate adjustment of the side walls of the farrowing crate without the use of tools require cumbersome adjustment procedures and most all systems make it quite difficult if not impossible to adjust the crate while a sow is in the crate.

The present invention contemplates a novel farrowing crate which overcomes the above discussed disadvantages of the existing systems and provides for an economical adjusting system which can be used in a simple manner by a single person with or without a sow in the crate. According to the invention, a farrowing crate adjustment system is provided which accommodates adjusting movement of the lower parts of the side walls out and up in a stair-step fashion in desired predetermined increments. According to an important feature of the invention, the stair-step adjusting structure is constructed so as to continuously provide an inwardly facing abutment structure for the lower side of the side wall during the adjustment process so that, even if a sow is in the crate, she cannot prevent or disrupt the adjustment process by pushing outwardly, since such would merely push the bottom part of the side wall against the adjustment apparatus structure. According to another feature of the invention, the bottom parts of the crate side walls are provided with pins which drop into holes in the steps of the adjustment system to maintain the side wall bottom in respective adjusted positions. According to preferred embodiments of the invention, the pin members are rigidly connected to bottom tubular members of the side walls, whereby a single operator can lift the respective side walls between the adjustment positions and at the same time insert both pins at the respective opposite ends of the side wall into corresponding apertures in a stepped bracket, without the need for additional assistance.

According to the preferred embodiments of the invention, the top section of each side wall is arranged to fit into vertically stacked spaced holding sockets. These holding sockets also exhibit lateral support to prevent lateral outward movement of the side walls during the adjustment process. According to preferred embodiments of the invention, the side walls are locked into an adjusted position by latch pins insertable through apertures in upper tubular members of the side walls and through aligned apertures in the vertically stacked series of holding sockets.

According to particularly preferred embodiments of the invention, the stair-step adjustment for the lower portion is provided by stepped brackets attached, one each, to the ends of the farrowing crate at each side (four total stepped brackets), which stepped brackets include end walls for also preventing axial movement of the side walls in a longitudinal direction of the farrowing crate during the adjustment process.

The apparatus of the present invention has all the desired effects regarding adjustment possibilities for accommodating various size sows, and also accommodates adjustment by a single person, without the use of tools, with or without the sow in position in the farrowing crate.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
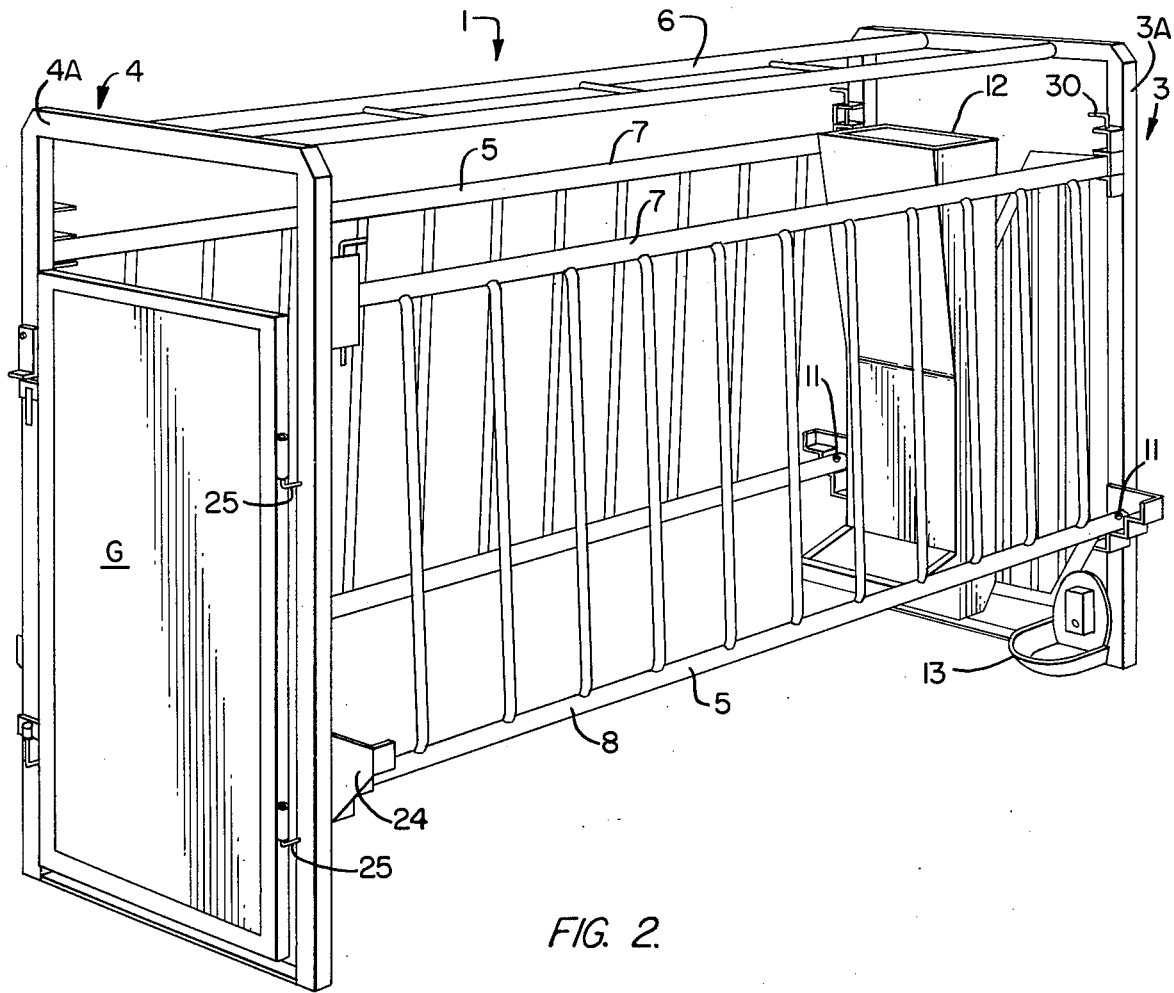
FIG. 1 is a perspective view of a farrowing crate utilizing the side wall adjustment apparatus of the present invention.

Throughout the various views, like reference numerals are used to designate like structure.

A farrowing crate 1 is provided which includes end wall 3 and 4 and side walls 5 connected together to form a farrowing crate enclosure for a sow. The frame members 3A, 4A, of the end walls 3 and 4 are supported and connected to one another by a tubular frame network 6 arranged at the top of the farrowing crate.

Figure 4:
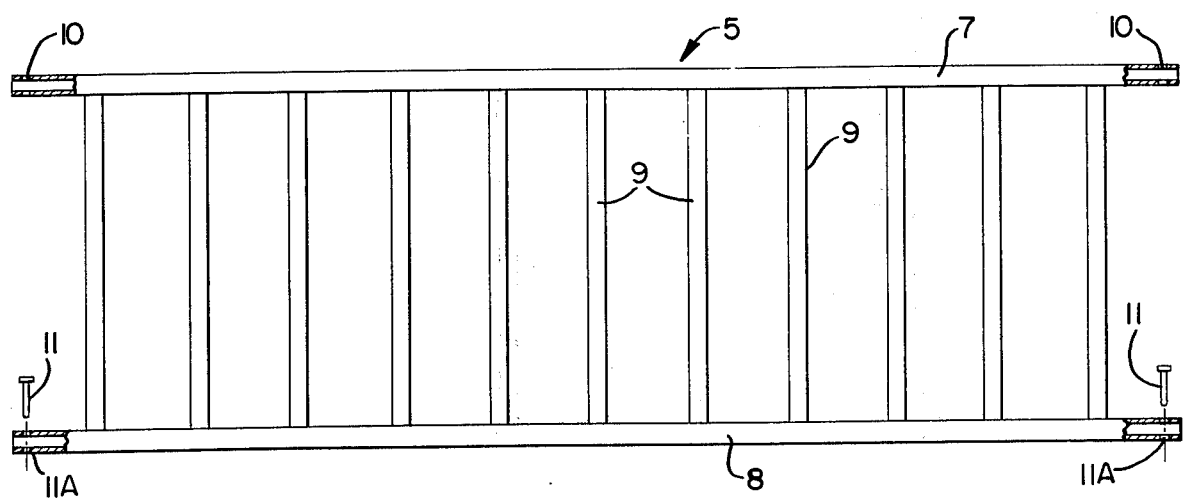
FIG. 4 is a side view of a side wall of the farrowing crate of FIG. 1.
Figure 5:
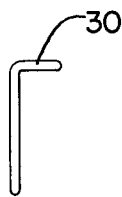
FIG. 5 shows a latch pin for latching a side wall to an end wall of a farrowing crate constructed in accordance with the invention.

The side walls 5 are constructed substantially symmetrically to one another and include, as best shown in FIG. 4, an upper tubular member 7, a lower tubular member 8, and vertical support struts 9 welded to each of these members 7 and 8. The upper tubular members 7 have through apertures 10 adjacent each of the opposite ends thereof, for a purpose to be described in more detail below. The lower tubular members 8 have pin members 11 welded in place adjacent the respective opposite ends thereof, also for a purpose to be more fully described below.

Figure 2:
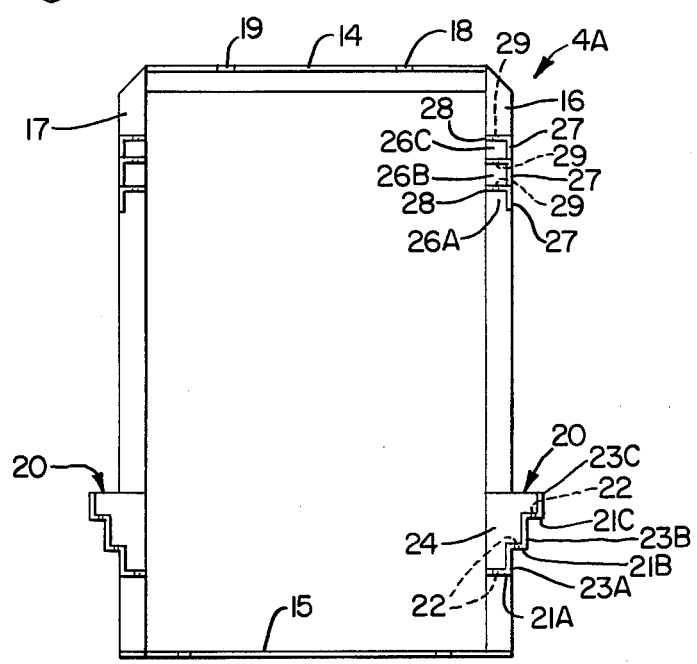
FIG. 2 is an end view of one of the end walls of the farrowing crate of FIG. 1.
Figure 3:
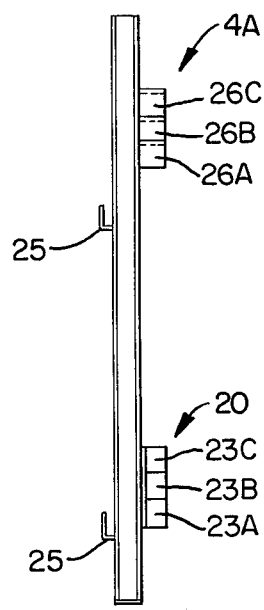
FIG. 3 is a side view of the end wall of FIG. 2.

The end walls 3 and 4, shown as being constructed differently in order to accommodate the feeder water system 12, 13 at end wall 3 and the hinged gate G at end wall 4, each include substantially similar connecting structures for connecting with the side walls 5, and therefore only a single end wall 4, shown in detail in FIGS. 2 and 3, will be described in detail herein. Referring to FIG. 2, the end wall frame 4A includes an upper frame cross piece 14, a lower frame cross piece 15, and vertically extending frame members 16 and 17. Reference numerals 18, 19 depict connecting places for welding to the upper tubular frame structure 6.

Stepped brackets 20 are provided adjacent the lower side of each frame members 16, 17. Each stepped bracket 20 includes three horizontal step surfaces 21A, 21B, 21C. Each of the horizontal step surfaces includes a vertically extending aperture 22. Vertically extending riser surfaces 23A, 23B, 23C are connected with the respective horizontal step surfaces 21A, 21B, 21C. The longitudinally outer ends of these stepped brackets 20 are bounded by backer plate 24.

Frame 4A also includes hinge pin 24 welded thereto to accommodate gate G.

At the upper area of each of the frame members 16 and 17, a series of vertically spaced sockets 26A, 26B, 26C are provided, each of which sockets includes a vertically extending support wall portion 27 and a horizontally extending support wall 28. Each of the support walls 28 includes an aperture 29 which is aligned with apertures of the other support wall 28.

The connection and operation of the adjustment apparatus for the side walls is as follows. With side wall 5 placed in the lower-most position, tubular member 8 rests at horizontal surface 21A and against vertical surface 23A, with pins 11 engaged through the apertures 22 through surface 21A. In this lowermost position, the upper tubular member 7 is pivotably movable in a direction toward the outside (right-hand direction referring to FIG. 2 and the frame member part 16) into socket 26A. In this position, a latch pin 30 can be manually inserted from above through aligned apertures 29 and through aperture 10 to lock side wall 5 in the lower adjusted position. If now it is desired to move side wall 5 to the next higher adjusted position, one need merely remove the latch pins 30, manipulate the entire side wall 5 by moving the tubular member 7 laterally inward so as to move out of the socket 26A. One then raises the lower tubular member 8 sufficiently so as to be able to insert the pins 11 into the apertures 22 at horizontal step surface 21B. At the same time, the socket 26B will be vertically aligned with the upper tubular member 7 and the upper part of side wall 5 can then be pulled outwardly and the latch pins 30 dropped in place at the respective opposite ends. Since the backer plate 24 and the side walls 23A of the stepped brackets 20 effectively prevent the lower tubular members 8 from being pushed too far in any given direction to upset the adjustment process, such as may occur due to movement of a sow in the crate, a single operator can easily make the adjustment. Likewise, the upper portion of the side wall is always restrained as long as the tubular member 7 is only maintained at the same level as a portion of the sockets 26A, 26B, 26C. Once the lower tubular members 8 have been adjusted and their pins 11 inserted in the openings 22, it is a very simple matter for the operator to balance the gate in the adjusted position with one hand and insert the latch pins 30 with the other hand.

Since, in particularly preferred embodiments, the adjustment and holding bracket structure both at the top and at the bottom of the end walls 3, 4 are made substantially of plate or heavy sheet metal bent and welded to the frames 3A, 4A, the manufacturing costs are minimal, and the sturdiness and reliability of the finished product is very high. The construction and/or modification of the side walls 5 themselves is very simple, since one need merely drill the holes 10 in the upper tubular member 7 and drill similar holes for accommodating the pins 11 which are then welded in place at the lower tubular member 8. (Referring to FIG. 4, pins 11 are inserted downwardly in apertures 11A and then welded in place to protrude downwardly from member 8.)

While we have shown and described one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

We claim:

1. Farrowing crate apparatus or the like having a front wall, a rear wall, first and second side walls extending between the front and rear walls, relatively fixed support structure disposed adjacent the respective ends of said side walls, and connecting means connecting said side walls to said fixed support structure to form a farrowing crate enclosure for a sow or the like, which enclosure is bounded at the front and rear by the front and rear walls and is bounded at the sides by the side walls, wherein the connecting means includes:
lower connecting means adjustably connecting a lower part of said first side wall to said support structure,
and upper connecting means adjustably connecting an upper part of said first side wall to said support structure,
said lower connecting means including laterally outwardly and upwardly stepped detent means having a plurality of step detents located at respective different vertical and horizontal positions and lower locking detent means selectively lockingly engageable with said step detents, said stepped detent means being connected to one of said first side wall and said support structure, said lower locking detent means being connected to the other of said first side wall and said support structure,
said lower stepped detent means and locking detent means being configured to accommodate manual vertical and lateral adjusting movement of said first side wall between respective adjusted positions with portions of said stepped detent means limiting lateral outward movement of said first side wall with respect to said support structure during said adjusting movement such that manual adjustment of said side wall can be carried out simply and without tools and with minimal danger that a sow inside of the crate will substantially disrupt the adjustment process even if she presses laterally outwardly against the side wall during said adjusting movement.

2. Apparatus according to claim 1, wherein said upper connecting means includes a plurality of vertically spaced upper support detent means at said support structure, said upper support detent means being engagable with said first side wall to laterally support the same in each of its adjusted positions.

3. Apparatus according to claim 2, wherein said upper support detent means include portions for limiting lateral outward movement of said first side wall with respect to said support structure during said adjusting movement.

4. Apparatus according to claim 3, wherein said upper connecting means includes upper locking means separate from said side wall and said upper support detent means, said upper locking means being insertable in apertures provided at said side wall and said support structure to lock said side wall in its adjusted positions.

5. Apparatus according to claim 4, wherein said upper support detent means include portions separate from said upper locking means for limiting vertical movement of said side wall when in an adjusted position.

6. Apparatus according to claim 5, wherein said stepped detent means includes a stepped bracket attached to said support structure and exhibiting upwardly facing horizontal step surfaces for vertically supporting said first side wall and laterally inwardly facing vertical step surfaces for horizontally supporting said first side wall.

7. Apparatus according to claim 6, wherein said step detents include step apertues in said horizontal step surfaces and said lower locking detent means include locking pin means fixed to said first side wall and insertable downwardly into said step apertures.

8. Apparatus according to claim 1, wherein said stepped detent means includes a stepped bracket attached to said support structure and exhibiting upwardly facing horizontal step surfaces for vertically supporting said first side wall and inwardly facing vertical step surfaces for horizontally supporting said first side wall.

9. Apparatus according to claim 8, wherein said step detents include step apertures in said horizontal step surfaces and said lower locking detent means include locking pin means fixed to said first side wall and insertable downwardly into said step apertures.

10. Apparatus according to claim 9, wherein said locking pin means include pin members welded to respective opposite longitudinal ends of said first side wall and engagable with a respective stepped bracket provided at each of said ends at the support structure.

11. Apparatus according to claim 7, wherein said locking pin means include pin members welded to respective opposite longitudinal ends of said first side wall and engagable with a respective stepped bracket provided at each of said ends at the support structure.

12. Apparatus according to claim 11, wherein said support structure is formed at the respective front and rear walls of said farrowing crate, and wherein said connecting means includes similar upper and lower connecting means adjustably connecting the second side wall to corresponding parts of said support structure.

13. Apparatus according to claim 12, wherein said side walls are of tubular construction with upper and lower horizontal tubular members interconnected by a plurality of vertical tubular members welded thereto, wherein said lower tubular members are supported directly at said horizontal and vertical step surfaces when in an adjusted position, and wherein said upper tubular members are supported directly at said upper support detent means when in an adjusted position.

14. Apparatus according to claim 13, wherein each of said stepped brackets includes an end wall for limiting movement of said tubular members in a longitudinal direction.

15. Apparatus according to claim 1, wherein said support structure is formed at the respective front and rear walls of said farrowing crate.

16. Apparatus according to claim 15, wherein said connecting means includes similar upper and lower connecting means adjustably connecting the second side wall to corresponding parts of said support structure.

17. Apparatus according to claim 1, wherein said connecting means includes similar upper and lower connecting means adjustably connecting the second side wall to corresponding parts of said support structure.

18. Apparatus according to claim 1, further comprising top frame member means rigidly connecting said front and rear walls and bounding said enclosure at the top.

19. Apparatus according to claim 1, wherein said upper connecting means are configured to maintain said first side wall at the same lateral position for a plurality of adjusted vertical positions thereof.

* * * * *